United States Patent [19]

Hautemont

[11] 4,054,202
[45] Oct. 18, 1977

[54] STEPWISE DRIVE MECHANISM

[75] Inventor: Jean-Claude Henri Hautemont, Gif-sur-Yvette, France

[73] Assignee: Societe Anonyme dite: Etude et Realisation de Chaines Automatiques ERCA, Orsay, France

[21] Appl. No.: 602,361

[22] Filed: Aug. 6, 1975

[51] Int. Cl.² .................................... B65G 23/18
[52] U.S. Cl. ............................. 198/805; 198/859
[58] Field of Search .......... 198/203, 41, 690, 805, 198/859; 310/103; 74/210

[56] References Cited

U.S. PATENT DOCUMENTS

| | | | |
|---|---|---|---|
| 1,368,587 | 2/1921 | Villiers | 74/210 |
| 2,528,061 | 10/1950 | Knapp | 74/210 X |
| 2,800,994 | 7/1957 | Hill | 198/203 |
| 2,953,238 | 9/1960 | Buccicone | 198/690 |
| 2,974,672 | 3/1961 | Fox | 198/203 X |
| 3,033,353 | 5/1962 | Burnett et al. | 198/203 |
| 3,208,296 | 9/1965 | Baermann | 74/210 X |
| 3,263,606 | 8/1966 | Poynter | 198/690 |
| 3,273,001 | 9/1966 | Baermann | 198/293 UX |
| 3,308,312 | 3/1967 | Ehrenberg | 310/13 |
| 3,497,056 | 2/1970 | Clark | 198/203 |
| 3,612,252 | 10/1971 | Yu | 198/203 X |
| 3,788,447 | 1/1974 | Stephanoff | 198/203 X |

FOREIGN PATENT DOCUMENTS

| | | | |
|---|---|---|---|
| 599,244 | 1/1926 | France | 198/203 |
| 2,028,765 | 10/1970 | France | |
| 1,056,051 | 4/1959 | Germany | 198/203 |

Primary Examiner—Evon C. Blunk
Assistant Examiner—Richard K. Thomson
Attorney, Agent, or Firm—Lewis H. Eslinger

[57] ABSTRACT

In a stepwise drive mechanism of the type comprising a pair of endless conveying members, such as for example metal chains, which are formed of a magnetic or magnetizable material, with gripping elements mounted thereon and in which the conveying members are located parallel to one another with the gripping elements fixed temporarily to a plastic film in which receptacles are formed and traverse a machine for processing food and/or pharmaceutical products having different work stations positioned at intervals whose length is a multiple of the feed steps of the drive mechanism, a drive is provided for synchronously driving the conveying members. This drive includes drive wheels respectively located in contact with a corresponding conveying member or chain along a predetermined arc and a drive arrangement for intermittently rotating the drive wheels through an elementary angular displacement which corresponds to a feed step of the conveying members. The conveying members are applied, along a predetermined arc, to their associated drive wheels over at least a contact surface area located on the peripheral portion of their associated drive wheels. A magnetic arrangement is provided in the driving wheel for producing a system of magnetic forces whose directions are substantially perpendicular to the contact surface area and whose resultant intensity is sufficient to prevent relative movement of the driving wheel and its associated conveying member. The contact surface area is annular and rotates about the axis of rotation of the drive wheel, with the drive wheel. The magnets in the drive wheels attract and hold the conveying members or chains to the contact surface of the driving wheels along the predetermined arc under the action of the magnetic pull which they produce.

13 Claims, 17 Drawing Figures

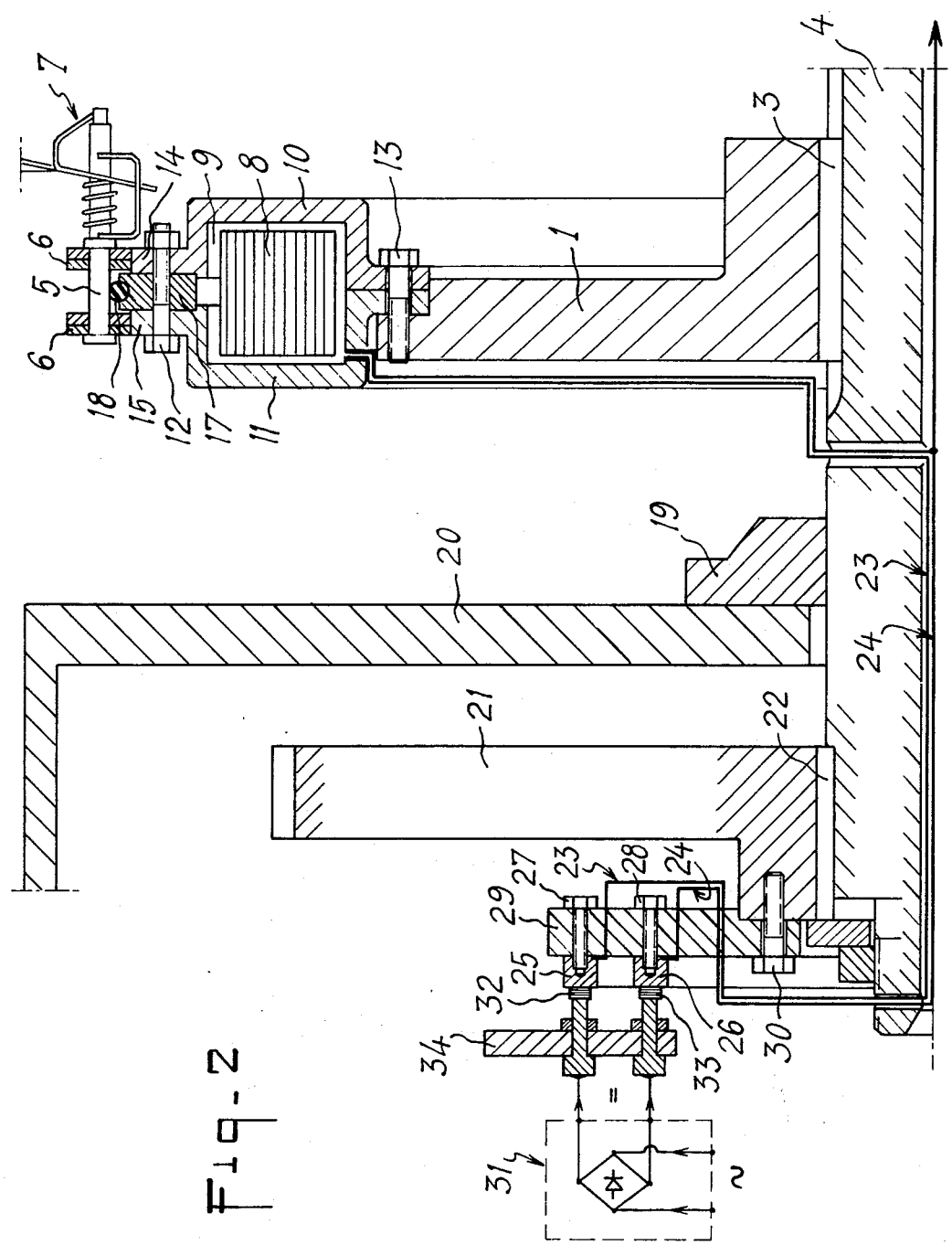

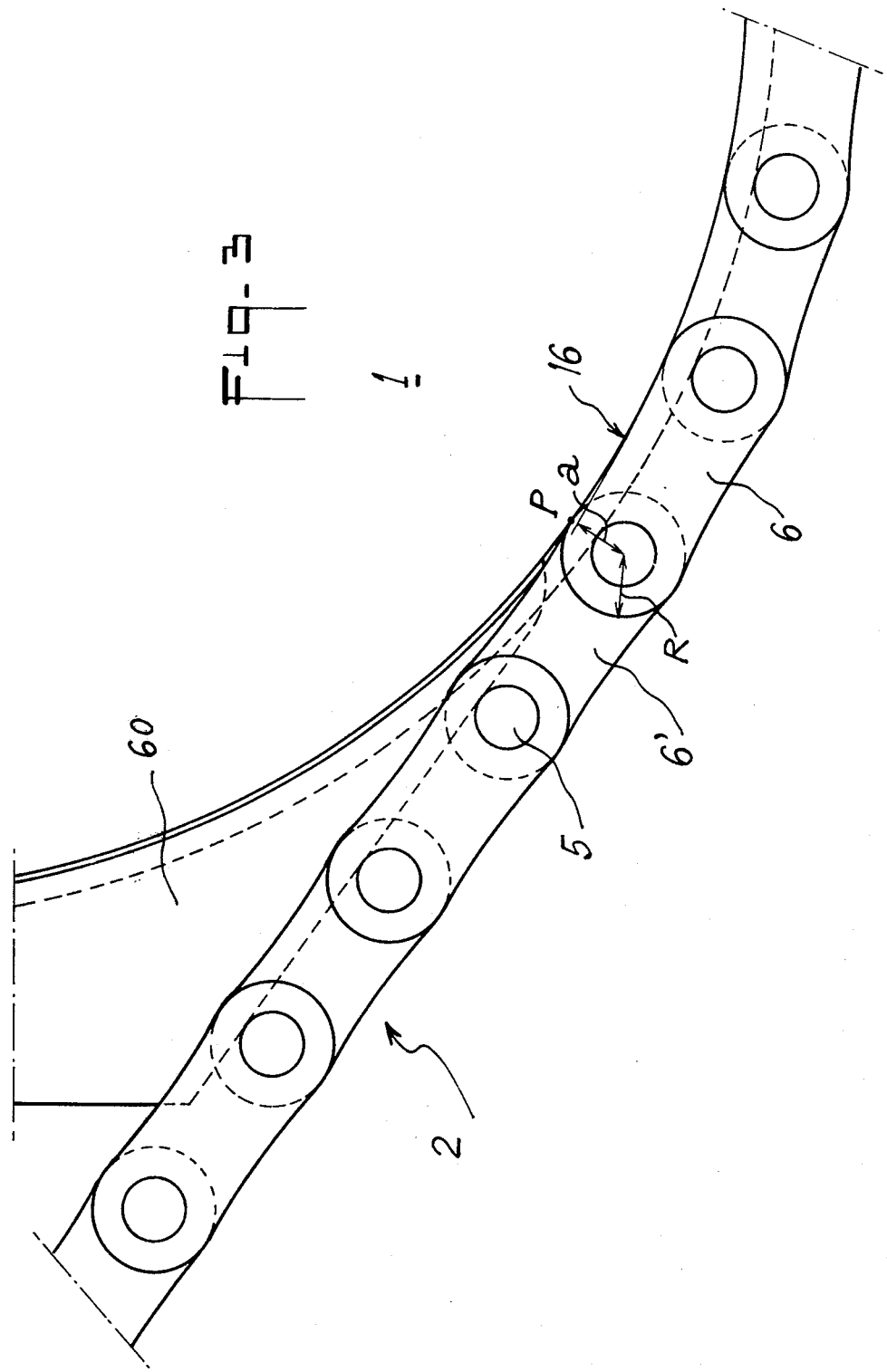

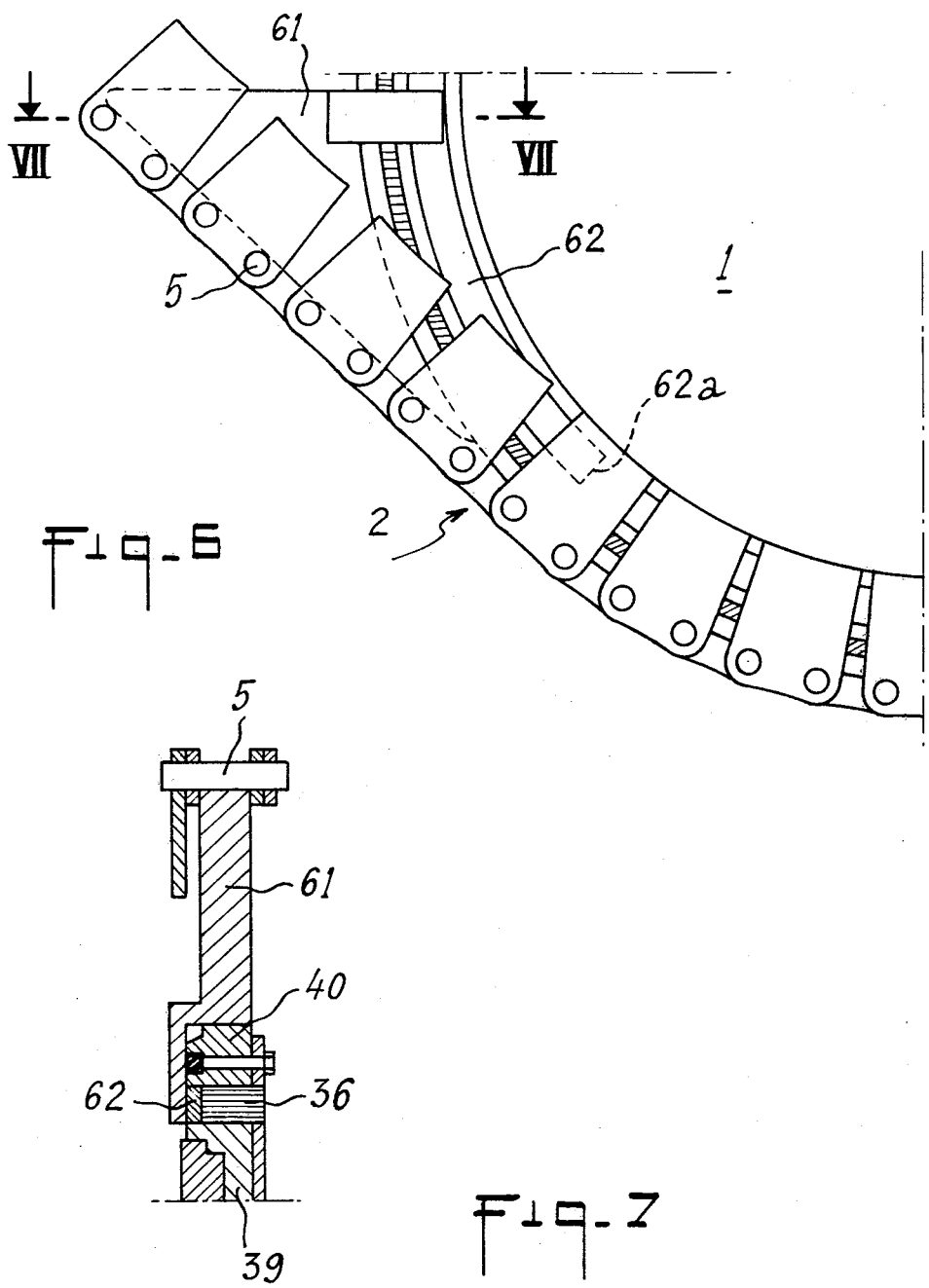

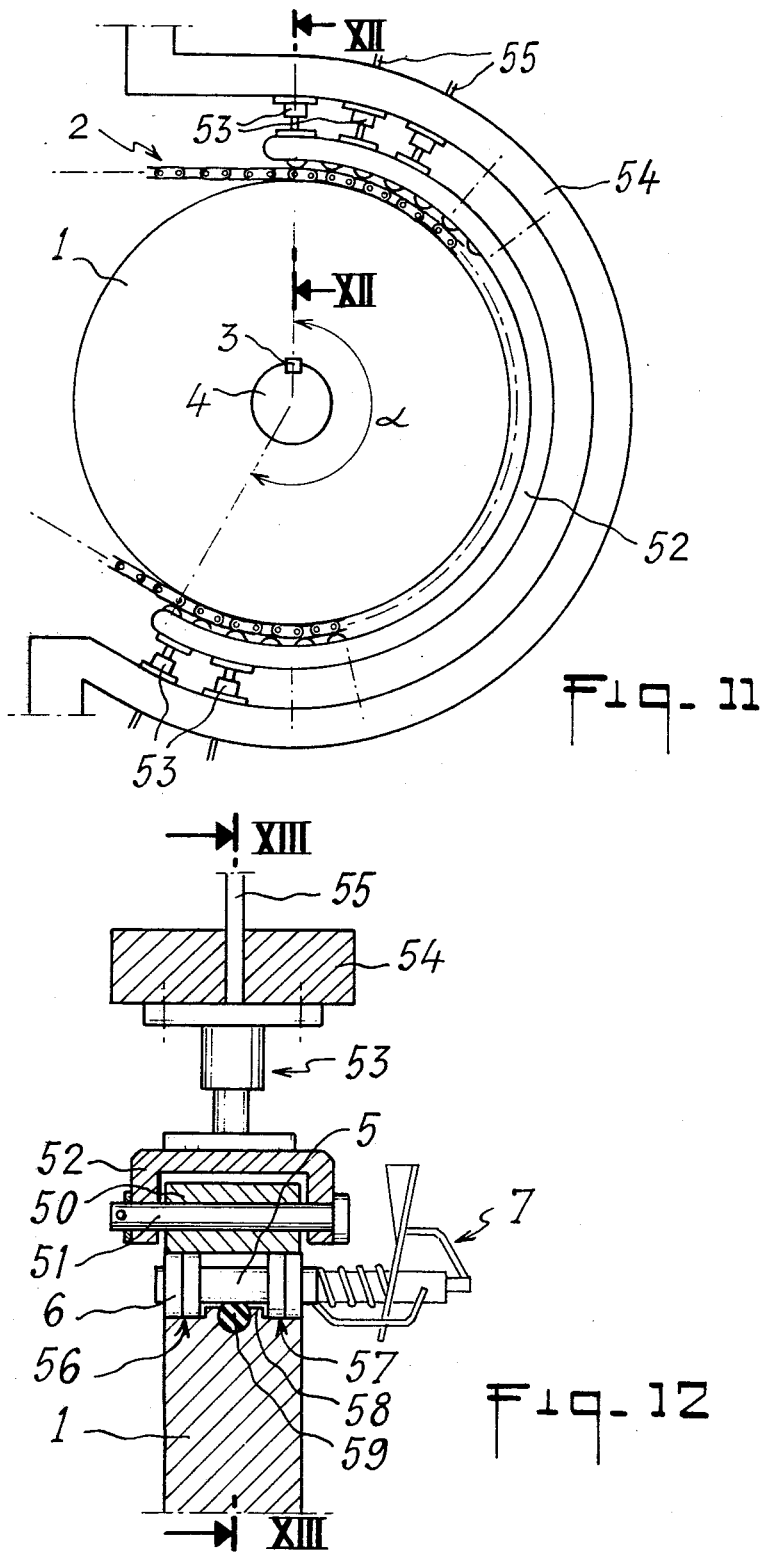

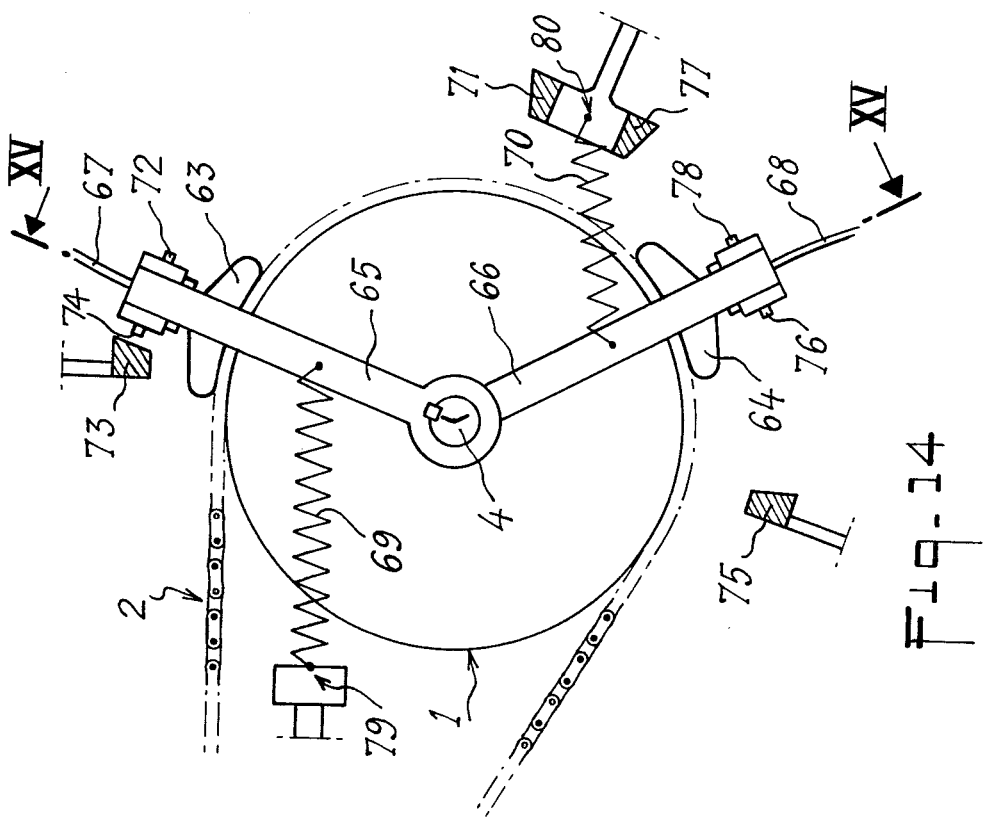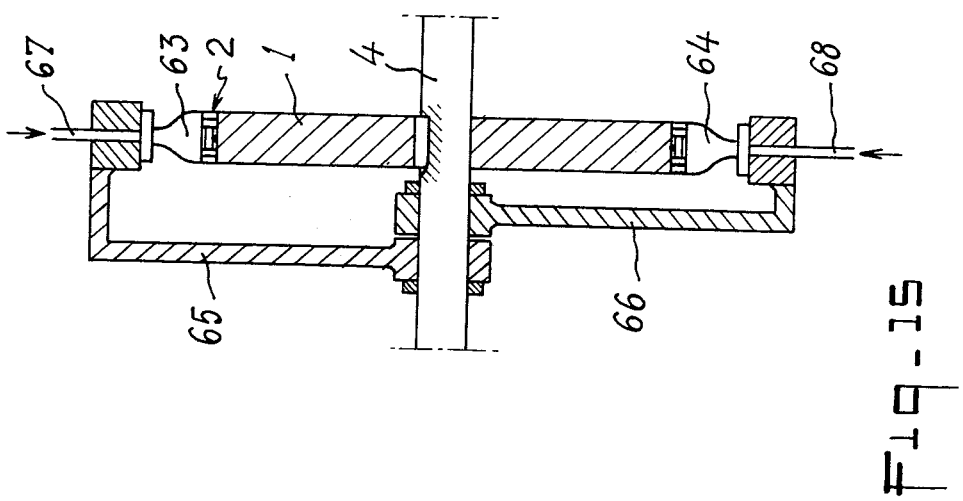

STEPWISE DRIVE MECHANISM

BACKGROUND OF THE INVENTION

The present invention relates to a stepwise drive mechanism of the type comprising endless conveying members, such as metal chains, etc., wherein the said members are parallel to one another, which transport a thermoplastic film in which receptacles are formed, which traverse a machine for processing food and/or pharmaceutical products and which are driven synchronously by driving wheels, each of which is in contact with a corresponding conveying member along a contact arc, whereby an elementary angular displacement of the said driving wheel corresponds to a feed step of the conveying member which also passes on a return wheel.

Numerous installations are known wherein one or more conveying members are moved stepwise to bring the product or products which they convey successively to one or more fixed working stations. Such an installation is, for example, a machine for processing food and/or pharmaceutical products as described in French Pat. 2,028,765 wherein a thermoplastic film is successively brought by means of two lateral conveying and guidance members to a film heating station, a station for shaping the receptacles in the film, a station for filling the shaped receptacles, a station for welding a sheet to cover the filled receptacles and a cutting station for the filled and sealed receptacles. Each film conveying and guidance member comprises an endless chain extending along the machine and a system of clips gripping the corresponding edge of the film and mounted on the links of the said chain. The chains are driven by toothed wheels whereof one elementary angular displacement corresponds to one film feed step and passing over return wheels. The toothed wheels are themselves driven synchronously e.g. by means of a Maltese cross device.

The driving of a chain conveying member by toothed wheels has the disadvantage of not giving a strictly constant feed step to the conveying device. In the case of the above-mentioned processing machine, the different working stations are positioned at intervals whose length is a multiple of the feed step of the thermoplastic film conveying device and an irregularity of this feed step leads to a poor positioning of the thermoplastic film and of the receptacles formed therein at the working station. The irregularities of the feed step are mainly due to faults in the chains. The causes of these faults are on the one hand the impossibility of manufacturing and assembling the links forming the chains in an absolutely regular manner and on the other the wear and elongation of the chains under tension, which leads to the links becoming out of true. As in addition these faults are not identical on any two chains they end up to creating variations in the length of the feed step leading to positioning variations at the working stations of the order of a few millimetres for a machine having a length of several meters. Another cause of the irregularity in the feed step is that the cooled thermoplastic film after passing through the heating and shaping stations tends to retract and come closer to the links of the chains via clips carried by these links and which grip the edges of the film. To take account of these irregularities in the feed step and permit an operation of the machine without too frequent adjustments, it is necessary to provide large tolerances in the positioning of the thermoplastic film at the different stations, particularly at the welding and cutting stations, while the receptacles are given sufficiently wide flanges to ensure a satisfactory welding and cutting. The consumption of thermoplastic material is increased and the positioning variations between the receptacles and the sheet provided for covering the same and which is printed, impair the appearance of the sealed and cut receptacles.

BRIEF SUMMARY OF THE INVENTION

The object of the invention is to obviate the above disadvantages and supply a stepwise drive mechanism of the type having at least one endless conveying member, whereby the said mechanism gives the said member a constant feed step.

In the case of a stepwise driving mechanism of the type indicated hereinbefore, according to the present invention the conveying member is applied along the contact arc over at least a contact surface area located in the peripheral portion of the driving wheel, whereby the said contact surface area is annular and rotates about the wheel shaft by a system of forces whose directions are substantially perpendicular to the said contact surface area and whose resulting intensity is sufficient to prevent any relative movement of the wheel and the conveying member.

It is admittedly already known, for example, from French Patent 406,464 to use a field of forces and particularly magnetic forces to apply a metal member such as a magnetisable cable or tape to a driving pulley on the one hand and to a driven pulley on the other. But in this case it involves continuous driving at a high rotational speed of the order of 1,000 r.p.m. and not stepwise driving. Furthermore, as the tape is also permanently applied to the driven pulley, the tape transmission side is substantially permanently fixed between the two pulleys and any elongation of the said side is absorbed by the sliding thereof relative to the driving pulley. However, according to the present invention, driving is in a stepwise manner and the field of forces is only used with respect to the driving wheel in order to obtain for each step an accurately defined and strictly constant length of travel.

According to a first embodiment of the mechanism according to the invention the wall has at least two annular contact surfaces of the same axes of that of the wheel, separated by an annular gap and the driving wheel is equipped with at least one magnet positioned in such a way that the conveying member is applied to these contact surfaces along the contact axis under the action of the magnetic pull exerted by this magnet, the said magnet preferably being an electromagnet.

According to a second embodiment of the mechanism according to the invention the conveying member is applied to the periphery of the wheel by an application device which rolls without sliding on the conveying member along the contact arc when the wheel is angularly displaced, the said application member being subject to system of forces directed substantially towards the wheel axis.

Advantageously, an annular friction member made from a deformable material such as rubber, is fixed to the wheel in such a way as to be compressed by the conveying member when the latter is applied to the contact surface or surfaces of the wheel along the contact arc.

It is also advantageous for the wheel to have an annular member for the longitudinal guidance of the conveying member on the wheel.

By the application of the contact member to one or more smooth and annular surfaces of the wheel, under the action of a system of forces such that any relatively movement of the wheel and the contact member is prevented, the displacements of constant angle of the wheel lead to feed steps of constant length no matter what the manufacturing faults or the degree of wear of the conveying member. An additional advantage of the invention is that the feed steps of two parallel conveying members driven by two wheels operated synchronously are identical, providing independence of differences in the formation of the two conveying members. Thus, the invention can be applied particularly well to the stepwise driving of a thermoplastic machine in a processing machine, such as indicated hereinbefore, in that it permits a precise and constant positioning relative to time of the film at all the working stations.

BRIEF DESCRIPTION OF THE DRAWINGS

Other and further objects of the present invention will be apparent from the following description and claims and are illustrated in the accompanying drawings which by way of illustration show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the scope of the appended claims. In the drawings show:

FIG. 2 a sectional view along the line II — II of FIG. 1;

FIG. 3 a detail of FIG. 1;

FIG. 6 a detail of the mechanism shown in FIGS. 4 and 5;

FIG. 7 a sectional view along the line VII — VII of FIG. 6;

FIG. 11 a schematic plan view of a second embodiment of the mechanism according to the invention;

FIG. 12 a partial sectional view along the line XII — XII of FIG. 11;

FIG. 14 a schematic plan view of a third embodiment of the mechanism according to the invention;

FIG. 15 a sectional schematic view along the line XV — XV of FIG. 14;

DETAILED DESCRIPTION OF THE PREFERRED EMBODIMENTS

Figure 1:
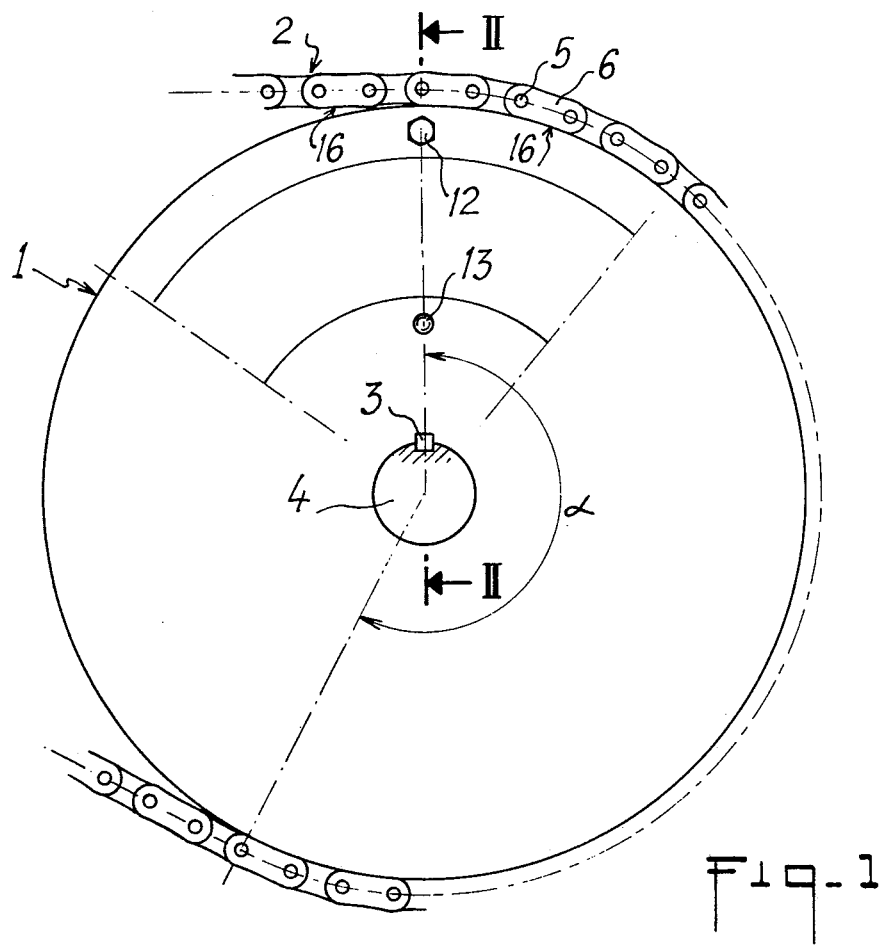
FIG. 1 a schematic plan view of a first embodiment of the mechanism according to the invention.

FIGS. 1 and 2 show a driving wheel 1 which drives an endless conveying member such as a chain 2 in contact with wheel 1 along the contact arc corresponding to the angle α. The wheel 1 is keyed at 3 to a shaft 4. The pins 5 of chain 2 which join the outer fish plates 6 with the inner fish plates, carry clips 7 (not shown in FIG. 1). The clips 7 are designed in such a way as to grip the edge of a thermoplastic film along the path of chain 2 in a processing machine for food and/or pharmaceutical products of the type described hereinbefore. The other edge of the thermoplastic film is also gripped by clips indentical to clips 7, carried by a second chain identical to chain 2, whereby the said second chain is driven in parallel with chain 2 by a second driving wheel identical to wheel 1 and relative to which it is moved synchronously by shaft 4. The two chains pass over not shown return wheels. In the drawings and hereinafter for reasons of simplicity, the second wheel and the second chain have not been shown or described.

According to a first embodiment of the invention the driving wheel is a magnetic wheel having a coil 8 (FIG. 2) located in an annular recess 9 defined by two side plates 10 and 11 made from magnetic material. Side plates 10 and 11 are fixed to one another by regularly annularly distributed screws 12 and 13 and form on the periphery of wheel 1 two annular shoulders 14 and 15. The annular outer surfaces of shoulders 14 and 15 form the contact surfaces of the wheel to which are applied the links of chain 2 by magnetic pull produced by coil 8. Coil 8 forms with the side plates 10 and 11 an electromagnet whose magnetic circuit is closed by the outer fish plate 6 of the links of chain 2. Preferably the stop surfaces 16 of the fish plate 6, which are applied to the contact surfaces of the wheel, have a radius of curvature equal to that of the said contact surfaces. Chain 2 is guided on wheel 1 by a ring 17 of rectangular cross-section made from non-magnetic material located between the shoulders 14 and 15 of side plates 10 and 11. The external diameter of ring 17 is greater than that of the contact surfaces of shoulder 14 and 15 and its width is less than the width of pins 5 between the inner fish plates of chain 2. Advantageously, a friction ring 18 made from deformable material such as natural or artificial rubber is placed in an annular groove made on the outer periphery of ring 17. When the stop surfaces of fish plates 6 are applied by the magnetic force to the contact surfaces of the wheel, ring 18 is crushed by pins 5 of chain 2, thus increasing the sliding resistance of chain 2 on driving wheel 1. Pins 5 can have a random cross-section which can be other than circular e.g. rectangular, and crush the ring 18 by means of an edge.

Shaft 4 supported by a bearing 19 fixed to a frame 20 is intermittently driven by a Maltese cross-shaped plate 21, keyed at 22 to shaft 4. The coil 8 is supplied with direct current by insulated conductors 23 and 24 connected to conductive rings 25 and 26 fixed by screws 27 and 28 to a disc 29 made from insulating material. Disc 29, whose shaft is identical to that of shaft 4 is mounted on plate 21 to which it is fixed by screws 30. A rectifier circuit 31 whose input is connected to the mains supplies direct current to fixed brushes 32 and 33 which rub against conductive rings 25 and 26. The fixed brushes 32 and 33 are fixed to a support 34 made from insulating material which is integral with frame 20 in a manner not shown. The conductors 23 and 24 between disc 29 and coil 8 enter radial and axial drilled holes made in shaft 4. The coil of the second driving wheel (not shown) is also supplied by conductors 23 and 24.

Although wheel 1 exerts a magnetic attraction over its whole periphery the disengagement of chain 2 on leaving wheel 1 at the end of the contact arc can be performed in a satisfactory manner. Referring to FIG. 3 it can be seen that the distance between the link axis and the stop surface 16 of a fish plate 6 is less than the radius R of the terminal portion of a fish plate, due to the machining of the stop surfaces 16 of the fish plates in accordance with the radius of curvature of the contact surfaces of wheel 1. Therefore, the inner fish plate 6' shown in FIG. 3 which is now only in contact with wheel 1 at P, relative to fish plate 6, acts as a lever to support point P tending to disengage the said fish plate 6 from wheel 1. Optionally a wedge-shaped fixed guidance member 60 connected, for example, rigidly to frame 20 in a manner not shown, can be positioned tangentially adjacent to wheel 1 to guide the pins 5 of chain 2 and to separate chain 2 from wheel 1.

Figure 4:
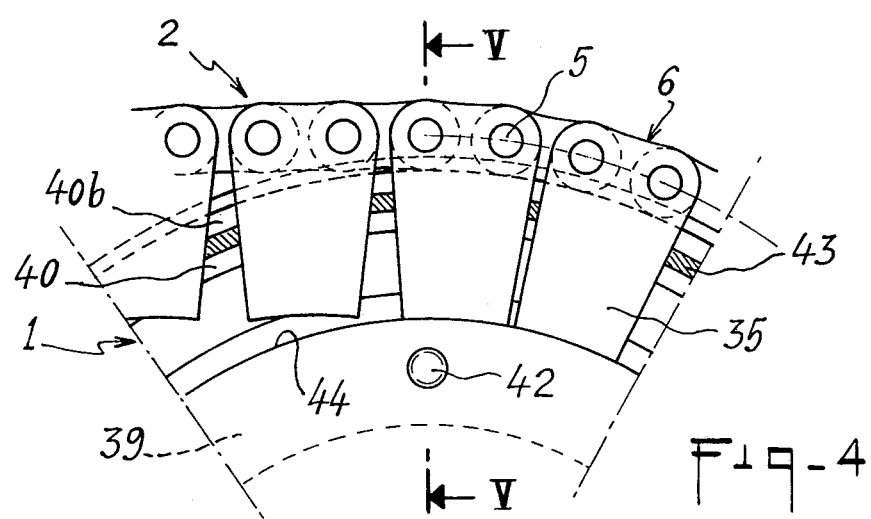
FIG. 4 a partial schematic view illustrating a variant of the mechanism according to the invention illustrated in FIGS. 1 and 2.
Figure 5:
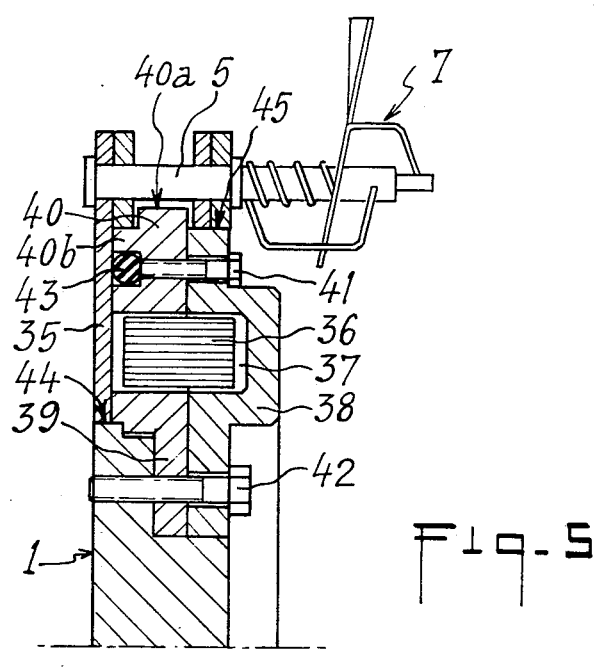
FIG. 5 a sectional view along the line V — V of FIG. 4.

FIGS. 4 and 5 illustrate a variant of the first embodiment of the driving mechanism described hereinbefore. On the side opposite to that where the clips 7 are located the outer fish plates 6 are extended towards the wheel shaft and form plates 35. Wheel 1 has a coil 36 positioned in a annular recess 37 defined by a side plate 38 and two rings 39 and 40 made from magnetic material. Rings 39 and 40 are fixed to side plate 38 by screws 41, 42 which are angularly distributed in regular manner. Under the action of the magnetic pull produced by coil 36, the plates 35 are applied against the lateral outer faces of rings 39 and 40 which form the contact surfaces of wheel 1. Coil 36, side plate 38 and rings 39 and 40 thus form an electromagnet whose magnetic circuit is closed by plates 35 along the contact axis. The stop surfaces of plates 35 applied to the contact surfaces are smooth and advantageously a friction lining made from deformable material such as artificial or natural rubber in the form of a ring 43 is positioned in an annular slot made in ring 40. When the plates 35 are applied against the contact surfaces of wheel 1 they crush ring 43 and the sliding resistance of chain 2 on wheel 1 is increased. The periphery 40a of ring 40 forms a guide for chain 2 on the wheel and engages between the inner fish plates of chain 2. On the peripheral portion of ring 40 on the side where plates 35 are applied, a slope 40b is formed laterally in such a way as to guide the said plates when chain 2 returns onto wheel 1. Wheel 1 has support surfaces 44 and 45 whereon respectively rest or are adjacent, the fish plates of chain 2 located on the side of clip 7 and the lower edges of plates 35, for example, when coil 36 is not energised. Preferably the support surfaces of the fish plates adjacent to the support surfaces 44 and 45 have a radius of curvature identical to that of the said support surfaces and a tolerance is provided between the pins 5 of the links of chain 2 and the periphery 40a forming a guide for ring 40.

At the level where chain 2 leaves wheel 1 a wedge-shaped fixed guidance member can be positioned laterally adjacent to wheel 1 for guiding the pins 5 of chain 2 and moving the latter away from wheel 1 (FIG. 6). To facilitate the disengagement of chain 2 from wheel 1 member 61 has a magnetic shunt 62 made from magnetic material and shaped like a circular arc which engages between rings 39 and 40 and causes a leakage flux between these two rings (FIG. 7). The end 62a of magnetic shunt 62 extends to the level of the outlet of chain 2 relative to wheel 1.

The driving wheel 1 described in the reference to FIGS. 1 to 7 has an electromagnet whose coil is toric and whose shaft is identical to that of the wheel. Other construction methods for the coil can also be used, particularly the peripheral portion of the wheel can be equipped with a plurality of coils having radial axes and giving wheel 1 and series of poles distributed over its circumference.

Figure 8:
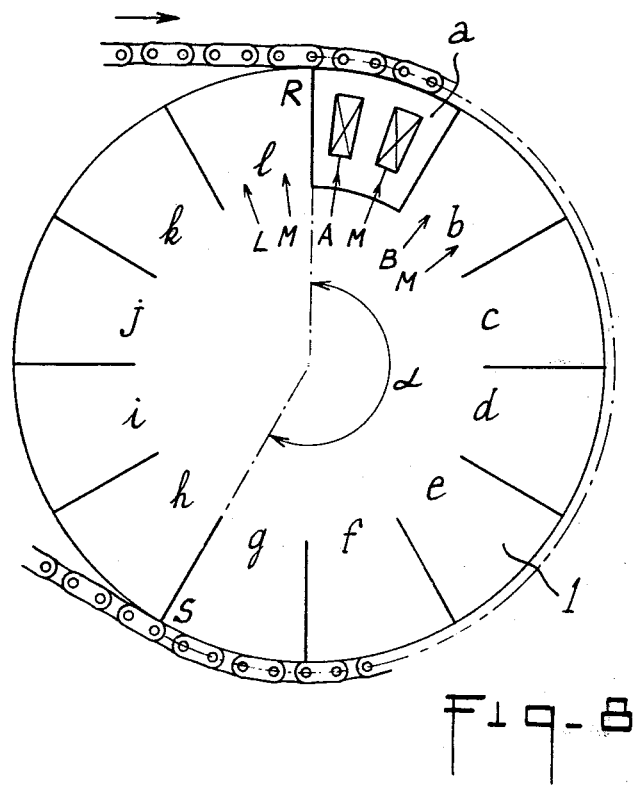
FIG. 8 a schematic plan view of a special embodiment of the magnetic wheel.
Figure 9:
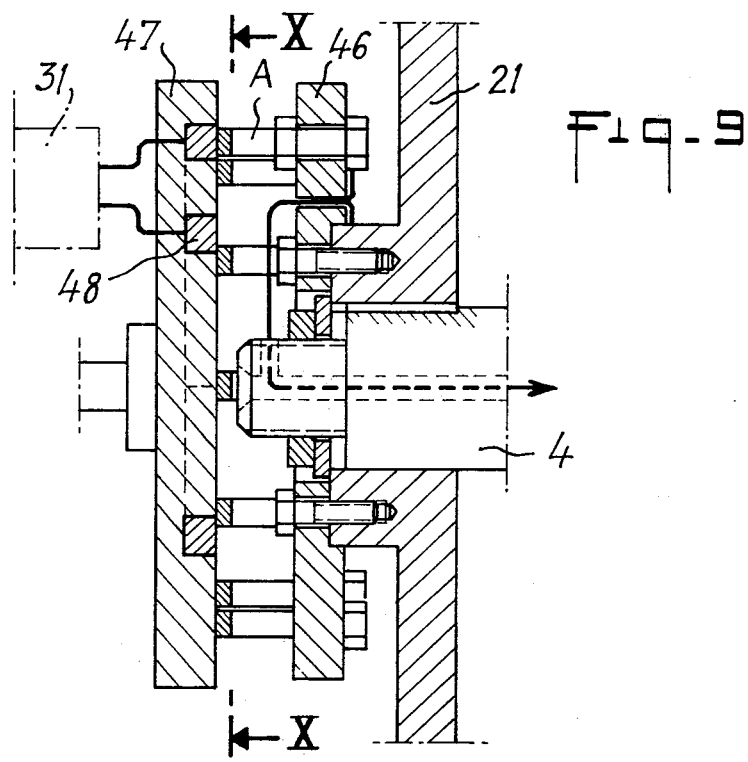
FIG. 9 a schematic sectional view of the power supply device for the magnetic wheel of FIG. 8.
Figure 10:
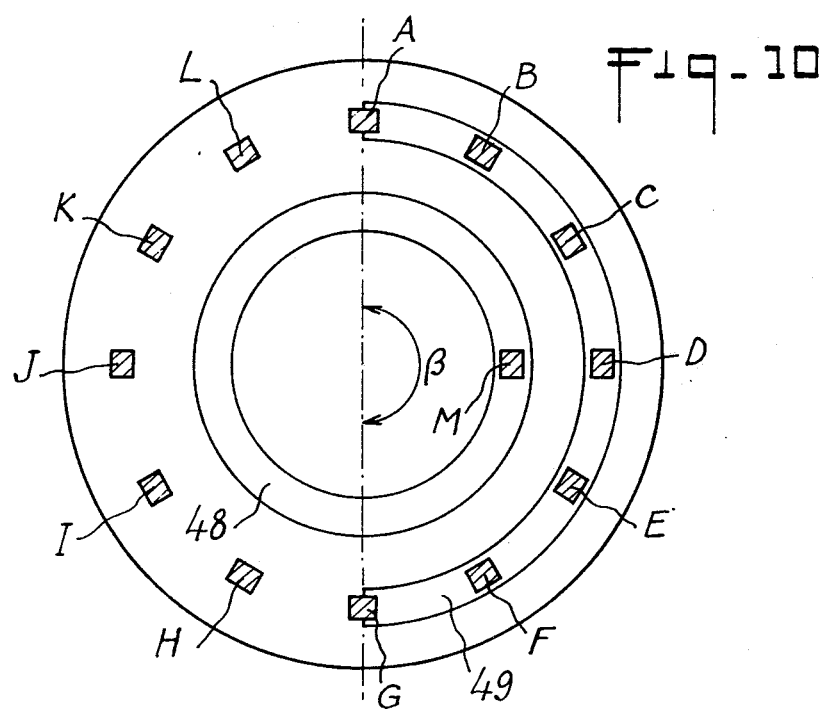
FIG. 10 a schematic sectional view along the line X — X of FIG. 9.

Another embodiment of a magnetic driving wheel 1 is shown in FIGS. 8, 9 and 10. According to this embodiment the wheel has a series of independent electromagnets distributed over its periphery and supplied separately. As can be seen in FIG. 8, the wheel is, for example, subdivided to twelve identical segments a to l each having an electromagnet. The electromagnets are supplied by pairs of different conductors: (A,M), (B,M), ( . . . ), (L,M). A commutation device illustrated in FIGS. 9 and 10 makes it possible to interrupt the supply to an electromagnet when the segment of wheel 1 in which it is located, is not included in angle α corresponding to contact arc RS, R being the point where the chain returns onto the wheel and S its removal point. This commutation device has a brush-holder disc 46 made from an insulating material fixed to the Maltese cross plate 21. Disc 47 carries twelve brushes A to L arranged regularly over the same first circle and to which are connected conductors A to L and a brush M arranged on a second circle, which is concentric to the first and to which is connected conductor M. A fixed wheel 47 made from an insulating material is positioned co-axially to the brush holder disc 46 and has a conductive ring 48 and a conductive arc 49 connected to the output terminals of the rectifier circuit 31. The conductive ring 48 is swept by brush M and the conductive arc by brushes A to L. By giving the angle β, at which the conductive arc is viewed, a value smaller than the angle α corresponding to the contact arc and by positioning the brush holder disc 46 in an appropriate manner relative to the driving wheel 1, it is possible to ensure that none of the electromagnets is supplied when the segment in which it is located is not covered by angle α. Thus, an easy disengagement of chain 2 is possible at the end S of the contact arc.

With this embodiment of the magnetic wheel it is possible to adopt a configuration of the periphery of wheel 1 similar to that shown in FIG. 1 or the variant of the periphery of the wheel and the chain shown in FIG. 4.

Figure 13:
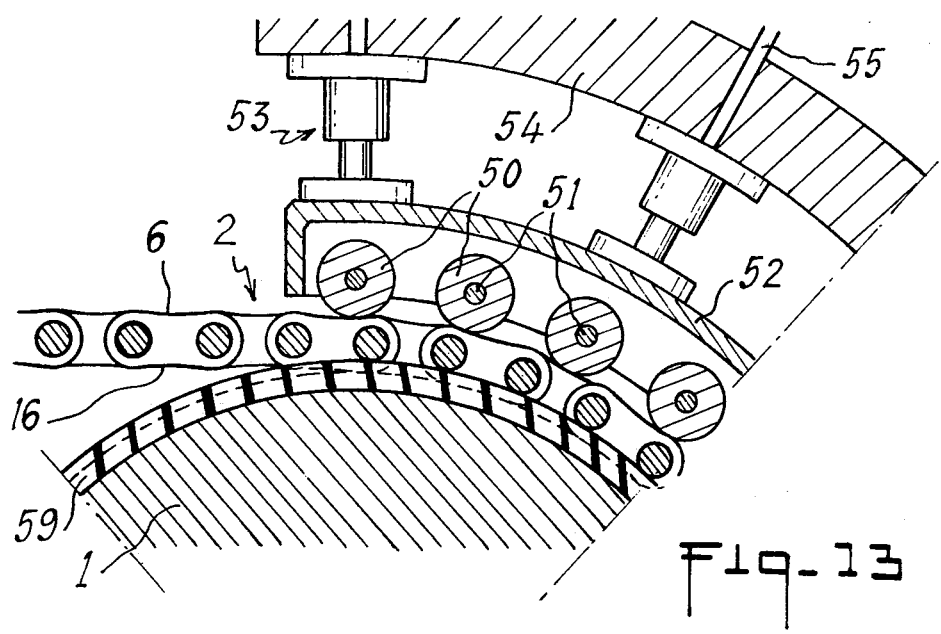
FIG. 13 a partial sectional view along the line XIII — XIII of FIG. 12.

FIGS. 11, 12 and 13 show a second embodiment of the mechanism according to the invention according to which the chain 2 is applied to the driving wheel 1 by pressure along the contact arc. These drawings only show the driving wheel and the application device exerting this pressure, the driving of the wheel and its shaft 4 being the same as that illustrated relative to FIG. 2. The application device for chain 2 to wheel 1 comprises a series of rollers 50 which can freely roll without sliding about their spindles 51. Rollers 50 can be made from an only slightly deformable friction material such as hard rubber and can be directly applied and roll without sliding on the fish plate 6 of the links of chain 2. It is also possible to place between the rollers 50 and the fish plate 6 a friction strip which surrounds the system of rollers and which rolls without sliding on fish plate 6. Spindles 51 are mounted in a casing 52 adjacent to chain 2 and having a U-shaped cross-section open towards the wheel shaft, the shape of casing 52 being produced by the location of the U about the wheel shaft with angle α corresponding to the contact arc. A series of jacks 53 fixed to frame 54 are supplied with pressurised fluid by pipes 55 and exert on casing 52 a pressure which is substantially directed towards the shaft of wheel 1. Under the action of this pressure the fish plate 6 of the links of chain 2 are applied to the annular surfaces 56 and 57 which form the contact surfaces on the periphery of wheel 1. The stop surfaces 16 of fish plate 6 preferably have a radius of curvature identical to that of contact surfaces 56 and 57 on which they are supported. Between the annular contact surfaces 56 and 57, the wheel has a shoulder 58 which serves as a guide for chain 2. Advantageously a toric friction ring 59 made from a deformable material such as artificial or natural rubber, is placed in a groove formed on the periphery of shoulder 58. When the stop surfaces of fish plate 6 are applied to the contact surfaces of wheel 1 ring 59 is crushed by the pins 5 of chain 2 and the sliding resistance of chain 2 on wheel 1 is increased. Pins 5 have a rectangular cross-section and crush the ring 59 by means of an edge.

Although the pressure application device described hereinbefore relative to FIGS. 11, 12 and 13, is constructed in one piece and its width corresponds to that of the contact arc, it is also possible to make it in several pieces and to only apply the chain by pressure to part of the width corresponding to the contact arc.

FIGS. 14 and 15 illustrate a third embodiment of the invention according to which the chain 2 is applied to wheel 1 by means of movable member subject to a substantially radially directed pressure. According to this third embodiment the chain 2 is applied by pressure to the wheel 1 by means of two shoes or jacks 63 and 64 carried by brackets 65 and 66. The brackets are mounted free about shaft 4. When the jacks 63 and 64 are supplied with pressurised fluid by means of pipes 67 and 68 connected to a not shown pressurised fluid source, brackets 65 and 66 rotate about shaft 4 in opposition to the tension exerted respectively by springs 69 and 70. When jack 63 reaches stop member 71 the latter acts on the exhaust valve 72 which connects the piston chamber of jack 63 with atmosphere, thus, causing the return of jack 63 against stop member 73 under the action of spring 69. Stop member 73 is made from a flexible material and acts on the intake valve 74 which connects the piston chamber of jack 63 with the pressurised fluid source. In the same way when jack 64 reaches stop member 75 the latter acts on the exhaust valve 76 of jack 64 and the latter is brought against stop member 77 which then acts on intake valve 78. Stop members 71, 73, 75 and 77, in the same way as the attachment members 79 and 80 for springs 69 and 70, are fixed and rigidly connected, for example, to frame 20 in a not shown manner. Brackets 65 and 66 must be placed in such a way that a jack supplied with pressurised fluid always exists and the stop members 73 and 75 are positioned in such a way that the travel of jacks 63 and 64 is inclined in the contact arc. As described with reference to FIG. 12 wheel 1 is preferably provided on its periphery with an annular guidance surface for chain 2 and an annular friction ring.

Figure 16:
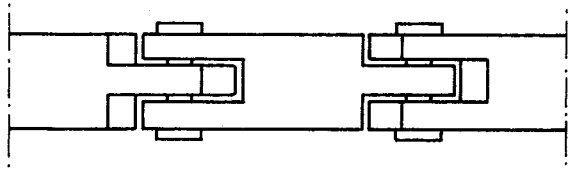
FIG. 16 and 17 a special embodiment of the conveying member.
Figure 17:
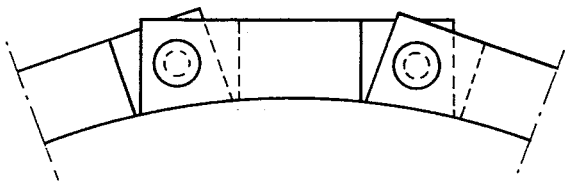

Although relative to the above description a conveying member, in the form of a chain with links closed by fish plates was chosen, it is possible to use a chain with solid links such as shown in FIGS. 16 and 17. By giving the stop surfaces of these links a radius of curvature identical to that of the contact surfaces of the wheel, the area of the contacting faces of the wheel and chain is greater than that obtained by using links with fish plates. Furthermore the use of rings and friction rings is then superfluous.

Finally, conveying members other than linked chains can be used, thus it is also possible to employ a notched metal band or a belt, e.g. of stainless steel, having studs. In these cases the conveying member can be flexible and it is then no longer necessary as in the case of the linked chain to shape the stop or support surfaces of the conveying member so that they have the same radius of curvature as the contact or support surfaces of the wheel with which they co-operate.

Now that the preferred embodiments of the invention have been described and illustrated, it must be understood that these are capable of variation and modification and it is not therefore desired to be limited to the precise details set forth, but to include such modifications and alterations as fall within the scope of the appended claims.

What we claim is:

1. In a stepwise drive mechanism of the type comprising a pair of endless conveying members formed of a magnetic material with gripping means thereon, wherein the said conveying members are parallel to one another and wherein said gripping means are fixed temporarily to a thermoplastic film in which receptacles are formed and traverse a machine for processing food and/or pharmaceutical products having different working stations positioned at intervals whose length is a multiple of the feed steps of said drive mechanism, and wherein the improvement comprises means for driving said conveying members synchronously, said drive means including driving wheels respectively located in contact with a corresponding conveying member along a predetermined contact arc, return wheels and means for intermittently rotating said driving wheels through an elementary angular displacement corresponding to a feed step of the conveying member, said conveying member being applied along the predetermined contact arc of their associated driving wheels over at least a contact surface area located in the peripheral portion of their associated driving wheels, and means for producing a system of magnetic forces whose directions are substantially perpendicular to the said contact surface area and whose resulting intensity is sufficient to prevent relative movement of the wheel and conveying member, said contact surface area being annular and rotating about the axis of rotation of the driving wheels, said means for producing a magnetic force including at least one magnet positioned in each of said driving wheels whereby the conveying member is attracted to and held against said contact surface along said predetermined contact arc under the action of the magnetic pull exerted by said magnet, and wherein said conveying members comprise chains formed of a plurality of links respectively including spaced pairs of fish plates formed of magnetic material at least one of said links closing at least partly the magnetic circuits formed by the magnets carried by the driving wheels, each of said fish plates having a stop surface formed thereon which is applied by magnetic pull to a contact surface of the driving wheel and has a curvature identical to that of the said contact surface.

2. A mechanism according to claim 1, wherein each of said driving wheels has at least two laterally spaced annular contact surfaces whose central axis is coincident with the axis of rotation of the driving wheel and separated by an annular gap.

3. A mechanism according to claim 1, wherein the said magnet is an electromagnet supplied with direct current.

4. A mechanism according to claim 3, wherein each of said driving wheels is subdivided into radial segments, and each of said segments has an electromagnet mounted therein.

5. A mechanism according to claim 1 wherein said magnet comprises a plurality of electromagnets located in circumferentially spaced relation in each of said driving wheels, means for supplying direct current, independently to each of said electromagnets, said supplying means including commutation means for supplying current only to electromagnets of the segment of the driving wheels which are located within the portion of the wheel corresponding to the contact arc.

6. A mechanism according to claim 2, wherein the contact surfaces have tangential planes parallel to the wheel shaft and are located on the outer periphery of the wheel.

7. A mechanism according to claim 1 including a fixed guide member for the conveying member having a pre-wedge shaped configuration and arranged at the end of the contact arc where the said conveying members move away from their associated driving wheel thereby to facilitate disengagement of the conveying members from the driving wheels.

8. A mechanism according to claim 1 including a fixed magnetic shunt arranged at the end of the contact arc where the conveying member is disengaged from the wheel.

9. A mechanism according to claim 1 including annular friction members formed of a deformable material fixed to the driving wheels so as to be compressed by the conveying members when the latter are applied to the contact surface of their associated wheels along the contact arc.

10. A mechanism according to claim 1, wherein each of said driving wheels has an annular member formed thereon and extending therefrom for longitudinally guiding the conveying member on the wheels.

11. A mechanism according to claim 1 wherein each of said driving wheels are subdivided into radical segments and each of said segments has an electromagnet mounted therein in circumferentially spaced relation; and means for supplying direct current independently to each of said electromagnets, said supplying means including commutation means for supplying current only to electromagnets of the segments of the driving wheels which are located within the portion of the wheel corresponding to the contact arc.

12. In a stepwise drive mechanism of the type comprising a pair of endless conveying members, formed of a magnetic material with gripping means thereon, wherein the said conveying members are parallel to one another and wherein said gripping means are fixed temporarily to a thermoplastic film in which receptacles are formed and traverse a machine for processing food and/or pharmaceutical products having different working stations positioned at intervals whose length is a multiple of the feed steps of said drive mechanism, and wherein the improvement comprises means for driving said conveying members synchronously, said drive means including driving wheels respectively located in contact with a corresponding conveying member along a predetermined contact arc, return wheels and means for intermittently rotating said driving wheels through an elementary angular displacement corresponding to a feed step of the conveying member, said conveying member being applied along the predetermined contact arc of their associated driving wheels over at least a contact surface area located in the peripheral portion of their associated driving wheels, and means for producing a system of magnetic forces whose directions are substantially perpendicular to the said contact surface area and whose resulting intensity is sufficient to prevent relative movement of the wheel and conveying member, said contact surface area being annular and rotating about the axis of rotation of the driving wheels, said means for producing a magnetic force including at least one magnet positioned in each of said driving wheels whereby the conveying member is attracted to and held against said contact surface along said predetermined contact arc under the action of the magnetic pull, said conveying members each comprising an endless chain formed of a plurality of links respectively including spaced pairs of fish plates formed of a magnetic material, said contact surfaces of the driving wheels being formed to extend perpendicular to the wheel shaft and located on one side of the wheel, and said links including an outer fish plate located on the same side as said contact surface and extending towards the wheel shaft thereby to define magnetic metal plates which close, at least partly, the magnetic circuits formed by the magnets carried by the driving wheels and which are attached to and held against the contact surface of the action of the magnetic pull.

13. A mechanism according to claim 12, wherein each of said fish plate extensions has a stop surface and said driving wheels each have at least one annular support surface cooperating with the stop surface of the chain fish plates, said support surface extending generally perpendicularly to and adjacent said contact surface and the stop surface of each fish plate having a curvature identical to that of the said support surface.

* * * * *